Feb. 28, 1961

J. R. JOHNSON 2,973,181

VALVE

Filed Oct. 31, 1960

INVENTOR
JESSE R. JOHNSON

BY Shanley & O'Neil

ATTORNEYS

INVENTOR
JESSE R. JOHNSON
BY Shanley & O'Neil
ATTORNEYS

United States Patent Office 2,973,181
Patented Feb. 28, 1961

2,973,181

VALVE

Jesse Ray Johnson, % Knowles-Fisher Corp., Gowanda, N.Y.

Filed Oct. 31, 1960, Ser. No. 66,115

8 Claims. (Cl. 251—172)

This invention relates to valves, and more particularly to valves for controlling the flow of fluid under pressure, of the type in which a valve member having an opening therethrough moves in such a way that the opening moves transversely of the direction of fluid flow, thereby selectively to open or close the valve.

This application is a continuation-in-part of my copending application Serial No. 668,725, filed June 28, 1957, which in turn is a continuation-in-part of my application Serial No. 565,896, filed February 16, 1956, and now abandoned.

Heretofore, valves employing this type of movement have been constructed so that the valve member is accurately fitted to move in sliding contact with its associated valve seat, thereby to secure sealing contact and to avoid leakage between the relatively moving parts. The initial accurate fitting and assembly is costly and time consuming and in use the contacting parts quickly wear and require replacement.

Attempts have been made to avoid the necessity of close fitting of parts, and attendant rapid wear, by positioning resilient deformable sealing members either between the moving parts or outwardly of the moving parts relative to the conveyed fluid. However, increases in the pressure of the conveyed fluid, and in fact any substantial pressure of the fluid, tend to cause such sealing means to leak or to blowout all together.

It has been proposed to dispose such sealing means inwardly of the moving parts relative to the conveyed fluid, so as to prevent blowouts; and while this arrangement is effective for that particular purpose, it has the disadvantage that the sealing means is forced against the moving parts by the pressure of the fluid. Not only is movement of the parts rendered more difficult by the friction of the sealing means pressing thereagainst, but also the sealing means is pressed against the edges of the valve member opening during movement of the valve member and quickly becomes worn and useless.

According to the present invention, the anti-blowout advantages of positioning the sealing means inwardly of the moving parts are obtained, but without the frictional disadvantages associated with such positioning. At the same time, the reduced frictional advantages of positioning the sealing means between or outwardly of the moving parts are obtained, but without the leakage and blowout disadvantages heretofore associated with such positioning. Briefly, this is done in the present invention by positioning the sealing means outwardly of the relatively moving parts and by mounting the sealing means on a casing portion which is so shaped as to urge the sealing means into sealing contact with the valve member, and at the same time subjecting the sealing means to the upstream pressure of the conveyed fluid applied inwardly, that is, applied to the side of the sealing means opposite the conveyed fluid. In this way, the blowout pressure of the conveyed fluid on the sealing means is counteracted and in most cases nicely balanced by the action of the casing against the seal and by the inwardly applied upstream pressure.

Other objects and advantages of the present invention will become apparent from a consideration of the following description, taken in conjunction with the accompanying drawings. It is to be understood, however, that the drawings are for the purpose only of illustrating the invention, and not for the purpose of defining the limits of the invention, reference for the latter purpose being had to the appended claims.

Figure 1:
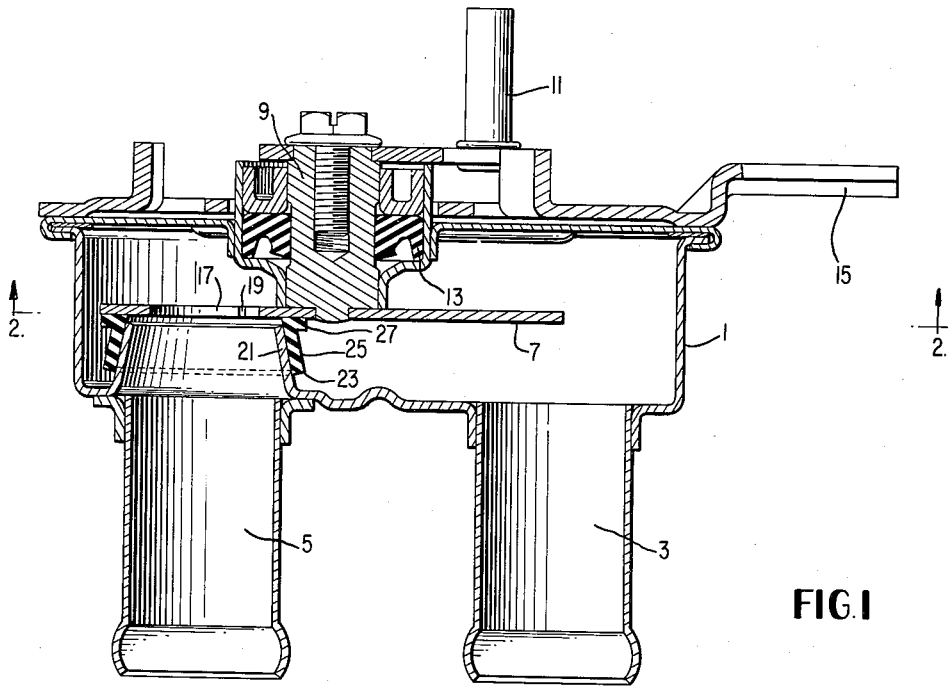
Figure 1 is a cross-sectional view showing the present invention embodied in the environment of a plate valve, in the open valve position.
Figure 2:
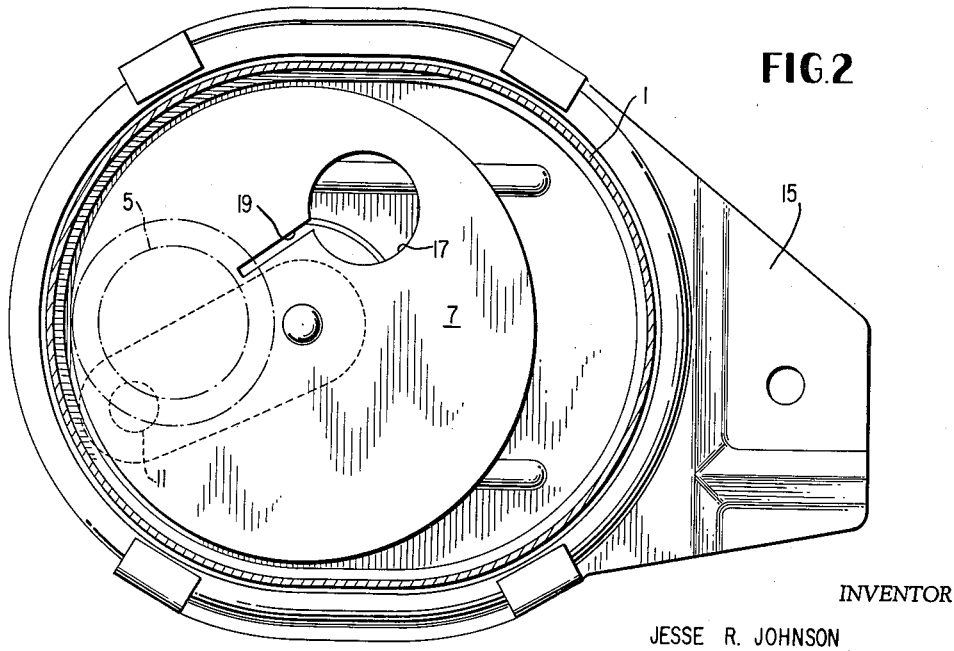
Figure 2 is a section on the line 2—2 of Figure 1, but showing the parts in the closed valve position.

Referring now to the drawings in greater detail, and more particularly to the plate valve embodiment of Figures 1 and 2 thereof, there is shown a valve having a valve casing 1 provided with an inlet port 3 and an outlet port 5 both of which open into the interior of valve casing 1. A uniplanar valve member 7 is disposed within but spaced from the side walls of valve casing 1. Valve member 7 is mounted on a shaft 9 which in turn is mounted on and extends through a side wall of valve casing 1 from outside the valve casing to within the valve casing. Valve member 7 is mounted on the inner end of shaft 9 and is rotatable with shaft 9 about the axis of shaft 9, which is perpendicular to the plane of valve member 7. Thus, valve member 7 turns in its own plane. An operating handle 11 disposed outside valve casing 1 provides leverage to turn shaft 9 and with it valve member 7. An elastic deformable seal 13 provides a fluid-tight closure between relatively movable parts 1 and 9 to prevent leakage of liquid about shaft 9. A bracket 15 permits mounting of the valve in a fixed position such that liquid inlet and outlet hoses (not shown) may be attached to inlet and outlet ports 3 and 5, respectively.

Valve member 7 is provided with an opening 17 therethrough adapted to be aligned with outlet port 5 to open the valve in the position shown in Figure 1 and to be displaced a substantial distance from outlet port 5 to close the valve in the position shown in Figure 2, upon rotation of valve member shaft 9 and handle 11. Opening 17 is provided with a slot 19 extending through the border of opening 17 in a direction toward the outlet port when the valve is closed, so that the closed end of slot 19 is the first to open and the last to close, thereby to avoid abrupt valve action.

The side wall of valve casing 1 surrounding outlet port 5 is necked down into the interior of body 1 so as to provide a neck 21 on the casing that cooperates with the valve member to seal the outlet port from the inlet port in the closed valve position of Figure 2. Sealing means 23 is mounted on neck 21 and seals between the portion of casing 1 that is neck 21 and valve member 7.

Sealing means 23 is of elastic deformable material such as rubber or the like and comprises first and second resiliently flexible portions 25 and 27, respectively, in the form of continuous flanges. Preferably, in its unstressed condition, first flexible portion 25 is cylindrical while second flexible portion 27 is annular and is disposed in a plane perpendicular to the axis of the cylinder of portion 25.

The outer contour of neck 21 is tapered and is reduced from casing 1 toward valve member 7. Specifically, the outer surface of neck 21 has closed cross-sectional configurations of progressively smaller diameter in a direction toward the valve member, and the inner surface of resilient portion 25 that is in fluid sealing contact with neck 21 is stretched on and entirely about and in contact with a continuous path around the tapered portion of the valve casing comprised by neck 21.

The configuration of the exterior of neck 21 is such that sealing means 23 is continuously urged toward sealing contact with valve member 7. This can be done in two ways. In the first place, sealing means 23 can be stretched on tapered portion 21 in unbonded relationship between the sealing means and the neck on which it is seated. In the second place, resilient portions 25 and 27 are disposed at at least 90° to each other, so that spreading of the free edge of resilient portion 25 more than the edge adjacent second portion 27 causes the free edge of second resilient portion 27 to move toward sealing contact with valve member 7 even if portion 25 is bonded to neck 21. In either case, the sealing means has a sealing surface disposed entirely around the fluid passageway between the inlet and outlet ports in the open valve position and in fluid sealing contact with the valve member entirely around a closed path on the valve member in at least the closed valve position. Moreover, even if the sealing means 23 is unbonded to neck 21 and rides back on that neck away from the valve member during manufacture, the first usage of the valve with upstream fluid pressure on the side of sealing means 23 opposite the fluid passageway that runs centrally thereof will move sealing means 23 into sealing contact with valve member 7.

It is important also to note that first resilient portion 25 is spaced from the adjacent side wall of casing 1 so as to be rearwardly unconfined relative to the plate valve member. As a result, sealing means 23 presses only gently against valve member 7 with a force due in part to the pressure of upstream liquid against the side of the sealing means opposite the fluid passageway therethrough, and in part to the action of tapered neck 21 in urging the sealing means toward the valve member.

In practice, with ports 3 and 5 connected to liquid inlet and outlet conduits, respectively, and the parts in the position of Figure 1, liquid is free to flow in through port 3 through the fluid passageway within casing 1 through opening 17 and out through neck 21 and outlet port 5. The fluid pressure is the same on all sides of sealing means 23, so that only the resiliency of the sealing means on tapered neck 21 urges the sealing means toward and into contact with valve member 7. If first resilient portion 25 is bonded to the outer contour of neck 21 and the first and second resilient portions 25 and 27 are disposed at at least 90° to each other in the unstressed condition of sealing means 23, then when first resilient portion 25 is stretched on neck 21, second resilient portion 27 will be correspondingly deformed against valve member 7 in an effort to preserve the unstressed angular relationship. On the other hand, if neck 21 and sealing means 23 are in unbonded relationship, then the first and second resilient portions 25 and 27 need not be at at least 90° to each other in their unstressed condition but instead may take substantially the shape seen in Figure 1 in their unstressed condition. In that latter event, however, the sealing means can slide on neck 21 toward the valve member and is in fact urged to do so not only by the taper of neck 21 but also by the upstream fluid pressure, that is, the pressure on the side of sealing means 23 opposite the fluid passageway through neck 21 in the closed valve position.

It is to be understood, however, that the upstream fluid pressure augments the seal between sealing means 23 and the casing at 21 and the valve member 7 not only when sealing means 23 is unbonded to neck 21 but also when it is bonded to neck 21. This is because when the valve member 7 is closed, the outlet pressure falls below the inlet pressure. The liquid pressure upstream of the valve member is thus higher than the pressure downstream of the valve member, and the pressure on the side of sealing means 23 opposite the fluid passageway through neck 21 is greater than the fluid pressure within the confines of neck 21. First and second resilient portions 25 and 27 are then further pressed against neck 21 and valve member 7, respectively.

Figure 3:
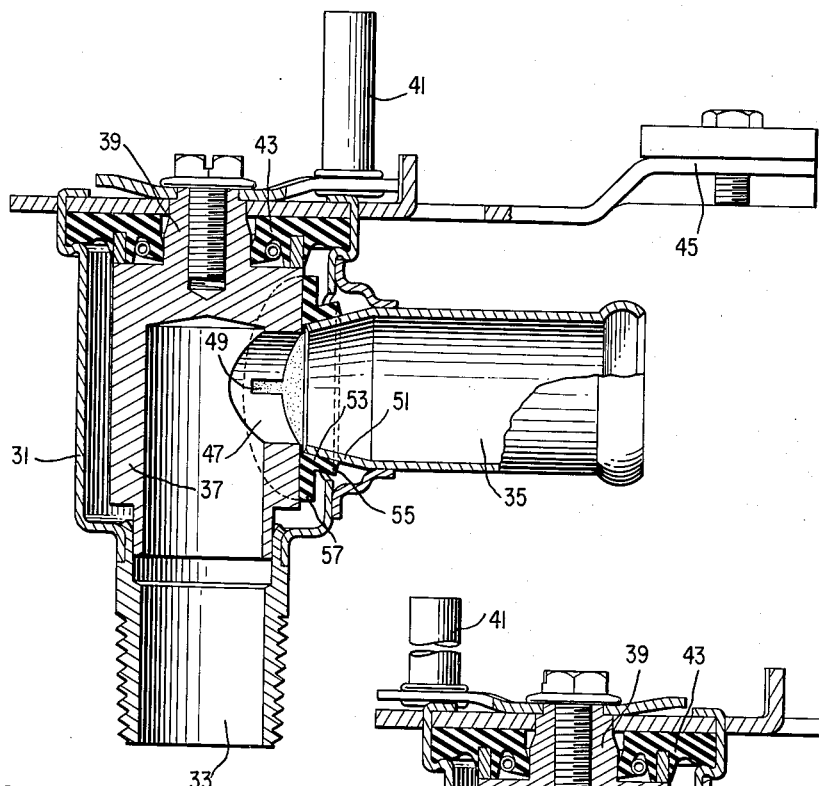
Figure 3 is a cross-sectional view of the present invention embodied in the environment of a rotary plug valve in the open valve position.
Figure 4:
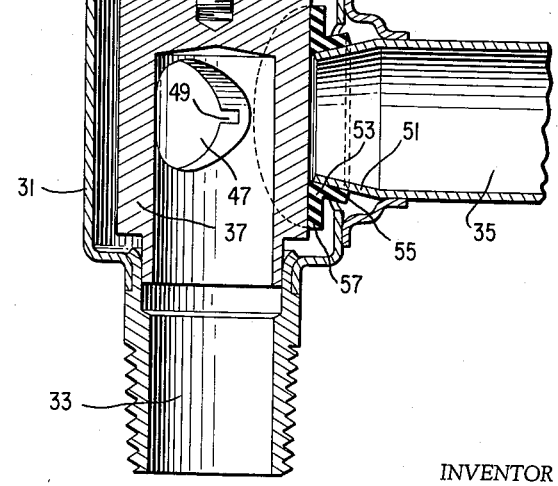
Figure 4 is a view similar to Figure 3 but showing the parts in the closed valve position.

An alternative embodiment of the valve of the present invention is shown in Figures 3 and 4 in its open and closed positions, respectively. The valve there shown includes a valve casing 31 having an inlet port 33 and an outlet port 35 interconnected by a fluid passageway as in the preceding embodiment. In the embodiment of Figures 3 and 4, however, the valve member is in the form of a rotary plug 37 in unitary assembly with a shaft 39 passing through a side wall of casing 31 and carrying at its end outside of the casing an operating handle 41 by which plug 37 may be turned back and forth between the open position shown in Figure 3 and the closed valve position shown in Figure 4. A seal 43 prevents leakage between casing 31 and shaft 39, and may for example take the form shown in my copending application Serial No. 750,484, filed July 23, 1958. As in the preceding embodiment, so also in the embodiment of Figures 3 and 4 a bracket 45 may be provided for mounting the valve fixedly with respect to the other parts with which it coacts.

Plug 37 is hollow and is open at its lower end and has an opening 17 through its side wall at the level of outlet port 35. Rotation of plug 37 about its axis brings opening 17 selectively into or out of registry with outlet port 35 thereby to open or close the valve, respectively. As in the preceding embodiment, so also in the embodiment of Figures 3 and 4, a slot 49 is provided to avoid abrupt opening and closing of the valve.

Casing 31 includes a neck 51 corresponding to neck 21 in the preceding embodiment and tapered in the same manner as neck 21. Sealing means 53 surrounds and is mounted on neck 51 in the same manner as sealing means 23 is mounted on neck 21, that is, in either bonded or unbonded relationship; and sealing means 53 includes a first resilient portion 55 and a second resilient portion 57 in fluid sealing relationship with neck 51 and plug 37, respectively, in the same relationship to each other and to casing 31, plug 37 and neck 51 as their counterparts in the preceding embodiment. It should be noted, however, that sealing means 53 is molded to conform to the cylindrical outer contour of plug 37, while the reduced end of neck 51 is cut off square. Nevertheless, sealing means 53 seals fluid tight against plug 37 and neck 51, thereby making unnecessary the expense of the manufacturing step of cutting the reduced end of neck 51 to conform to the curve of plug 37.

In operation, the embodiment of Figures 3 and 4 provides that upstream fluid pressure is continuously applied to the side of sealing means 53 opposite the fluid passageway in all valve positions. In the closed valve position of Figure 4, this upstream fluid pressure is applied through opening 47, which communicates with the interior of the valve casing surrounding plug 37 rather than with the outlet port 35. Also, in the open valve position shown in Figure 3, the lower end of plug 37 is in loosely guided relationship with the interior of the valve casing, so that the inlet port communicates not only with the outlet port through the valve member in the open position, but also with the interior of the casing surrounding plug 37.

In connection with both of the embodiments described above, it should be understood that the most convenient and the preferred cross-sectional configuration for necks 21 and 51 is circular and that the most convenient and preferred outer contour for these necks is truncated conical. However, the cross-sectional configurations are defined more broadly as closed and the taper is not restricted to conical, since these necks could have a configuration that is somewhat out of round, and have outer contours comprised of converging elements which are not rectilinear, without departing from the scope of the invention. It is necessary only that the outer contour of the necks be such as to urge the sealing means toward the valve member and that the sealing means be somewhat stretched entirely about and in contact with a continuous path around the tapered portion of the valve casing.

Similarly, a portion of the sealing means will always be urged toward the valve member, whether the sealing means is bonded or unbonded to neck 21 or 51. However, it is not necessary that any portion of the sealing means actually contact the valve member in the valve as manufactured. As the valves come from the factory, the sealing means, if unbonded to the neck, can be pushed up on neck 21 or 51 so that they do not touch the valve member. Nevertheless, the taper of that portion of the valve casing which is neck 21 or 51 continuously urges the sealing means toward the valve member; and in use, they are rapidly brought into contact with the valve member by the upstream fluid pressure acting against their sides opposite the fluid passageway that passes centrally through them and centrally through necks 21 and 51.

From a consideration of the foregoing disclosure, it will be evident that all of the aims of the invention as initially set forth have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A valve for controlling the flow of fluid under pressure, comprising in combination a valve casing having inlet and outlet openings therein and a fluid passageway therethrough extending between and interconnecting the inlet opening and the outlet opening, a valve member mounted in the valve casing for movement between an open position in which pressure fluid may flow through the passageway and a closed position in which the valve member closes the passageway and divides the passageway into an upstream portion and a downstream portion, sealing means surrounding the fluid passageway and having first and second resiliently flexible portions in the form of continuous flanges disposed at at least 90° to each other in their unstressed condition, said first flexible portion having a sealing surface disposed in fluid sealing contact with the valve casing entirely about the fluid passageway, said second flexible portion having a sealing surface disposed entirely about the fluid passageway in the open valve position and in fluid sealing contact with the valve member entirely about a closed path on the valve member in at least the closed valve position in use, the portion of the valve casing with which said sealing surface of said first flexible portion is in contact being tapered and having closed cross-sectional configurations of progressively smaller diameter in a direction toward the valve member, said sealing surface of said first flexible portion being stretched on and entirely about and in contact with a continuous path around said tapered portion of the valve casing, the configuration of the casing being such that the stretched surface will continuously urge said second flexible portion toward sealing contact with the valve member with said first and second flexible portions disposed at an acute angle to each other, and means transmitting upstream fluid pressure to the side of the sealing means opposite the fluid passage in at least the closed valve position to press said first and second flexible portions against the valve casing and valve member, respectively, thereby to augment the seal between said sealing surfaces and the valve casing and valve member.

2. A valve as claimed in claim 1, said first flexible portion when fully seated on the valve casing being spaced from the adjacent side wall of the casing.

3. A valve as claimed in claim 1, in which the valve member is uniplanar and has an opening extending therethrough, the valve member being movable in its plane between an open position in which said opening is disposed at least partially in the passageway and a closed position in which said opening is entirely displaced from the passageway.

4. A valve as claimed in claim 1, in which the valve member has a cylindrical contour and an opening extending through the cylindrical contour, the valve member being movable by rotation about the axis of the cylindrical contour between an open position in which said opening is disposed at least partially in the passageway and a closed position in which said opening is entirely displaced from the passageway.

5. A valve for controlling the flow of fluid under pressure, comprising in combination a valve casing having inlet and outlet openings therein and a fluid passageway therethrough extending between and interconnecting the inlet opening and the outlet opening, a valve member mounted in the valve casing for movement between an open position in which pressure fluid may flow through the passageway and a closed position in which the valve member closes the passageway and divides the passageway into an upstream portion and a downstream portion, sealing means surrounding the fluid passageway and having first and second resiliently flexible portions, said first flexible portion having a sealing surface disposed in unbonded fluid sealing contact with the valve casing entirely around the fluid passageway, the portion of the valve casing with which said sealing surface is in contact being tapered and having closed cross-sectional configurations of progressively smaller diameter in a direction toward the valve member, said unbonded sealing surface being stretched on and entirely about and in contact with a continuous path around said tapered portion of the valve casing, the configuration of said casing being such that the stretched unbonded surface will continuously urge said first flexible portion toward sealing contact with the valve member, said second flexible portion having a sealing surface disposed entirely around the fluid passageway in the open valve position and in fluid sealing contact with the valve member entirely around a closed path on the valve member in at least the closed valve position in use, and means transmitting upstream fluid pressure to the side of the sealing means opposite the fluid passage in at least the closed valve position to press said first and second flexible portions against the valve casing and the valve member, respectively, thereby to augment the seal between said sealing surfaces and the valve casing and valve member.

6. A valve as claimed in claim 5, said first flexible portion when fully seated on the valve casing being spaced from the adjacent side wall of the casing.

7. A valve as claimed in claim 5, in which the valve member is uniplanar and has an opening extending therethrough, the valve member being movable in its plane between an open position in which said opening is disposed at least partially in the passageway and a closed position in which said opening is entirely displaced from the passageway.

8. A valve as claimed in claim 5, in which the valve member has a cylindrical contour and an opening extending through the cylindrical contour, the valve member being movable by rotation about the axis of the cylindrical contour between an open position in which said opening is disposed at least partially in the passageway and a closed position in which said opening is entirely displaced from the passageway.

(References on following page)

References Cited in the file of this patent

UNITED STATES PATENTS

| | | |
|---|---|---|
| Re. 24,102 | Ohls | Dec. 13, 1955 |
| 2,506,097 | Melichar | May 2, 1950 |
| 2,547,831 | Mueller | Apr. 3, 1951 |
| 2,606,740 | Allen | Aug. 12, 1952 |
| 2,651,320 | Hirsch et al. | Sept. 8, 1953 |
| 2,732,170 | Shand | Jan. 24, 1956 |
| 2,805,836 | Taylor | Sept. 10, 1957 |
| 2,845,949 | Parker | Aug. 5, 1958 |

FOREIGN PATENTS

| | | |
|---|---|---|
| 724,917 | Germany | Sept. 9, 1942 |